United States Patent [19]

Biancardi

[11] Patent Number: 4,725,075
[45] Date of Patent: Feb. 16, 1988

[54] ANTITHEFT DEVICE FOR MOTORCYCLES

[75] Inventor: Maurizio Biancardi, Via Crispi, 22, 20090 Trezzano S/N - Milan, Italy

[73] Assignees: Roberto Celio; Maurizio Biancardi; Edoardo Pirovano, all of Milan, Italy

[21] Appl. No.: 888,478

[22] Filed: Jul. 23, 1986

[30] Foreign Application Priority Data

Jul. 24, 1985 [IT] Italy .............................. 22586/85[U]

[51] Int. Cl.⁴ ............................................... B62H 5/00
[52] U.S. Cl. ................................... 280/763.1; 70/235; 280/289 L; 280/297
[58] Field of Search .............. 70/235; 280/289 L, 301, 280/302, 303, 763.1, 297

[56] References Cited

U.S. PATENT DOCUMENTS

| 633,010 | 9/1899 | Josef | 280/303 |
| 1,170,099 | 2/1916 | Pawsat | 280/302 |
| 2,082,248 | 6/1937 | Karpel | 280/302 X |
| 4,095,828 | 6/1978 | East | 292/148 |
| 4,298,211 | 11/1981 | Shitamori | 70/235 X |
| 4,444,407 | 4/1984 | Calmonte et al. | 280/289 L X |

FOREIGN PATENT DOCUMENTS 199775 7/1923 United Kingdom ................. 70/235

Primary Examiner—John J. Love
Assistant Examiner—Michael Mar
Attorney, Agent, or Firm—Arnold, White & Durkee

[57] ABSTRACT

This antitheft device acts on the stand of the motorcycle to lock it in a lowered position. It comprises a lock unit attachable at two different positions to the frame of the motorcycle by means of a key, which is provided with a latch element. At one setting of the block, the latch element will not interfere with the movement of the stand, allowing normal use of the motorcycle, and at the other position, the latch element will inhibit the stand raising.

2 Claims, 4 Drawing Figures

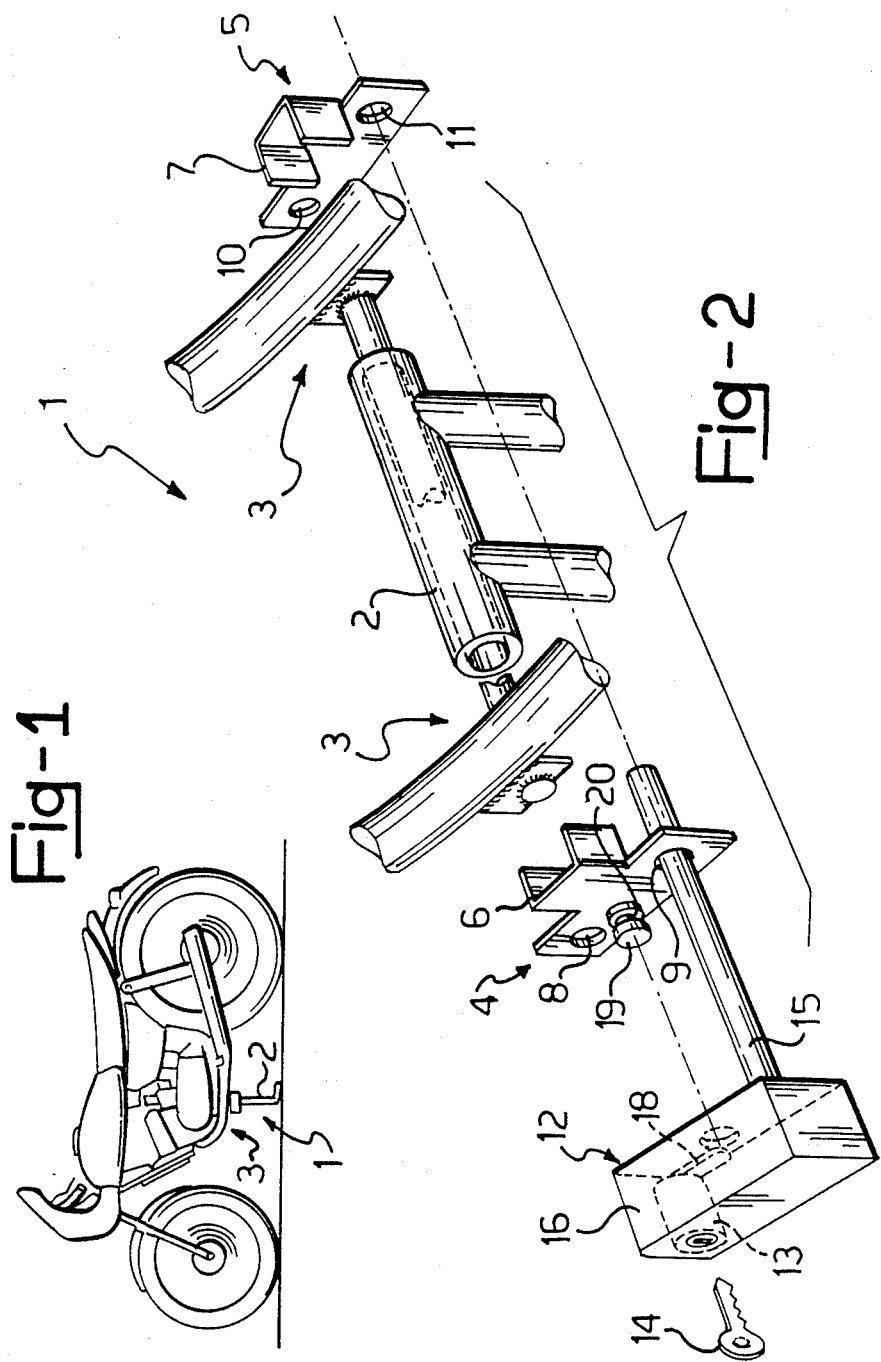

ANTITHEFT DEVICE FOR MOTORCYCLES

BACKGROUND FIELD

This invention relates to an antitheft device for a motorcycle having a stand movable between a lowered parking position and a raised position with respect to a frame.

As is known, there exists a demand in the field of antitheft devices for a device which can be specially reliable and safeguard motorcycles effectively against theft.

PRIOR ART

Currently known are antitheft systems for motorcycles, of a mechanical kind, which generally employ chains, that get in the way of the user and are somewhat unreliable.

Even conventional steering locks can only provide a very limited degree of protection against tampering, since they are easy to neutralize by a thief.

DISCLOSURE OF THE INVENTION

Accordingly, the primary object of this invention is to provide a motorcycle antitheft device of the mechanical kind, which is extremely reliable and can fit many types of motorcycles, for a minimum cost and space.

Another object of this invention is to provide a mechanical antitheft device for motorcycles, which can be installed either as standard equipment or as an optional item without involving any major alteration of the motorcycle.

Another object is to provide an antitheft device as indicated, which is highly convenient to operate and is nearly maintenance-free.

According to one aspect of the invention, these and other objects to become apparent hereinafter are achieved by an antitheft device for a motorcycle, comprising removable locking means to lock the stand to the frame in the lowered parking position.

BRIEF DESCRIPTION OF DRAWINGS

FIG. 1 is a perspective view showing a motorcycle incorporating an antitheft device according to this invention, in the locking position;

FIG. 2 is an exploded view, drawn to an enlarged scale with respect to FIG. 1, showing the major component parts of the antitheft device of this invention;

BEST MODE FOR CARRYING OUT THE INVENTION

Figure 3:
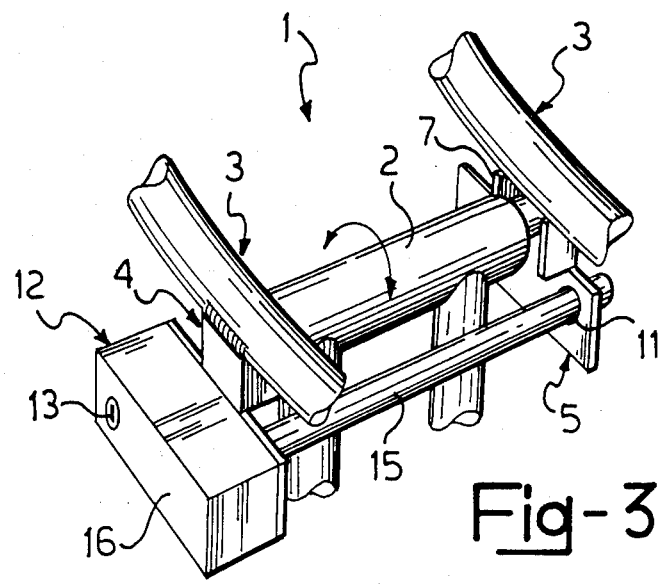
FIG. 3 is a fragmentary perspective view showing the antitheft device of the motorcycle shown in FIG. 1.
Figure 4:
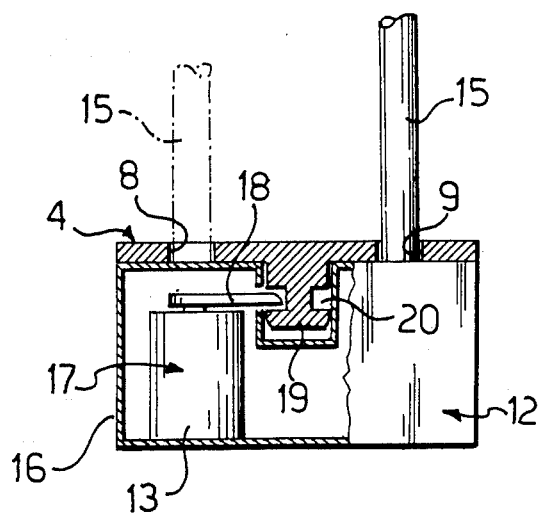
FIG. 4 is a part-sectional detail view of the antitheft device according to the invention.

Making now more specific reference to the cited drawing figures, and in particular to the exploded view of FIG. 2, an antitheft device according to the invention is indicated generally at 1 therein.

In particular, the antitheft device 1 is intended for cooperation with a stand 2 of a generic motorcycle, whose frame is designated with the reference numeral 3; the stand 2 is movable between a lowered parking position and a raised position, with respect to the frame 3.

The antitheft device 1 comprises a locking means to lock the stand 2 to the frame 3 in the lowered parking position.

The locking means comprises a lock unit 12 which has a head 16 and a latch element 15 fixed to the head 16. The head 16 includes a key mechanism 17 by which the lock unit 12 is secured to the frame 3 (as explained below) either in a release or unlocked position in which the stand 3 is free to move between its parking and raised positions or in a locking position in which the latch element 15 locks the stand 2 in its lowered parking position.

The locking means further comprises two plates 4 and 5 fixed to the frame 3 at opposite sides of the stand 2.

In the embodiment shown, the plates 4 and 5 are provided with U-bent brackets 6 and 7 which fit on and are welded to the frame 3.

Holes 8 and 9 are formed in the plate 4 and holes 10 and 11 are formed in the plate 5. Holes 8 and 10 are aligned and form a first pair of aligned holes. Holes 9 and 11 are aligned and form a second pair of aligned holes. In the release position of the lock unit 12, the latch element 15 is inserted in the first pair of holes 8 and 10. In the locked position, the latch element 15 is inserted in the second pair of holes 9 and 11.

The key mechanism 17 in the head 16 comprises a key cylinder 13 operated by a key 14 and a lever 18, driven by the key cylinder 13. A peg 19, provided on the plate 4, has a groove 20 for engagement with the lever 18 in order to secure the lock unit 12 to the frame 3.

The antitheft device 1 operates as follows.

In normal condition, the lock unit 12 is secured to the plate 4 in the release position; in this case, the stand 2 can be lowered or raised as usual, without any inconvenience. The device 1 is carried around easily.

After parking the motorcycle by lowering the stand 2, the antitheft device 1 may be activated. To this end, the user inserts the key 14 into the key cylinder 13, turns it through a predetermined angle (for example 90°) releasing the lock unit 12, removes the lock unit 12 extracting the latch element 15 from the first pair of holes 8 and 10, turns the lock unit 12 through 180° and places it again on the plate 4 inserting the latch element 15 into the second pair of holes 9 and 11, turns the key back securing the lock units 12 to the plate 4. In this locking position the stand 2 cannot be raised, since the latch element 15 prevents upward movement.

It may be seen from the foregoing that the invention fully achieves its objectives.

In particular, a mechanical antitheft device has been provided which is highly practical in use, and affords highly effective antitheft features. In fact, a potential thief, to steal the motorcycle, would be compelled to haul the motorcycle away with some other means of transportation, because he would be unable to neutralize the antitheft device by merely using cutting tools, since the position of the latch element makes cutting or sawing virtually impossible.

An antitheft device according to the invention may be incorporated to the structure of the motorcycle and be installed as standard equipment. It may also be supplied as an optional item to be installed with minimal alteration of the frame area at the attachment point for the stand.

In particular the antitheft device of this invention may be produced in kit form, complete with the cited lock unit and two plates for welding to the frame, one of which would be provided with the peg.

Lastly, with side stand-equipped motorcycles, it will be possible to use a hinge type of closure.

I claim:

1. An antitheft device capable of being placed in a locked or unlocked position for a motorcycle having a stand movable between a lowered parking position and a raised position with respect to a frame comprising:
   (a) two plates fixed to the frame on opposite sides of the stand, a first pair of holes formed in said plates and aligned with each other, and a second pair of holes formed in said plates and aligned with each other;
   (b) a latch element insertible either in said first pair of holes when the anti-theft device is in its unlocked position or in said second pair of holes when the anti-theft device is in its locked position; and
   (c) a head with a key mechanism attached to the end of said latch element, said key mechanism capable of removably securing said head and said latch element to the frame either in an unlocked position in which the stand is free to move between its parking and raised positions or in a locked position in which said latch element locks the stand in the parking position, said key mechanism further comprising a lever driven by a key cylinder and a peg on one of said plates provided with a groove for engagement with said lever.

2. The anti-theft device of claim 1 wherein said plates are provided with U-shaped brackets for fitting onto the frame.